(12) United States Patent
Ng (10) Patent No.: US 10,114,472 B2
(45) Date of Patent: Oct. 30, 2018

(54) SYSTEM AND METHOD FOR KEY FUNCTION SWITCHING

(71) Applicant: RAZER (ASIA-PACIFIC) PTE LTD., Singapore (SG)

(72) Inventor: Chern Ann Ng, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 137 days.

(21) Appl. No.: 15/204,242

(22) Filed: Jul. 7, 2016

(65) Prior Publication Data

US 2016/0313803 A1 Oct. 27, 2016

Related U.S. Application Data

(63) Continuation of application No. 12/293,658, filed as application No. PCT/SG2007/000317 on Sep. 19, 2007, now Pat. No. 9,417,707.

(51) Int. Cl.
*A01B 1/00* (2006.01)
*G06F 3/02* (2006.01)
(Continued)

(52) U.S. Cl.
CPC .......... *G06F 3/0238* (2013.01); *G06F 3/0219* (2013.01); *G06F 3/03543* (2013.01)

(58) Field of Classification Search
CPC .. A01B 12/006; G06F 3/0219; G06F 3/03543
See application file for complete search history.

(56) References Cited

U.S. PATENT DOCUMENTS 5,486,846 A 1/1996 Corner et al.
7,836,412 B1 11/2010 Zimmerman
(Continued)

FOREIGN PATENT DOCUMENTS

CN 2615751 Y 5/2004
CN 1241097 C 2/2006
(Continued)

OTHER PUBLICATIONS

"International Search Report and Written Opinion dated May 28, 2008," International Application No. PCT/SG2007/000317, 8 pages.
(Continued)

*Primary Examiner* — Charles Hicks
(74) *Attorney, Agent, or Firm* — Polsinelli PC (57) ABSTRACT

Personal computer (PC) and online gaming are gaining popularity around the world. Typically players use PC input devices such as keyboards and mice for playing PC games. Many of the modern PC games use a control scheme commonly known as the "WASD/Mouse", which is a combination of the "WASD" keys of the keyboard and the mouse as means for interacting with the PC games. Additionally, to further expand on game control functions, modifier keys are used in conjunction with other keyboard keys to serve as shortcut keys for activating such game control functions. However, due to the non-ergonomic positioning of the shortcut keys, players often suffer from wrist discomfort after PC game playing sessions due to increased strain placed on their wrists when using the shortcut keys frequently. An embodiment of the invention describes a system and method for switching processes selectable by keys on human interface devices.

19 Claims, 7 Drawing Sheets

(51) Int. Cl.
*G06F 3/0354* (2013.01)
*G06F 3/023* (2006.01)

(56) References Cited

U.S. PATENT DOCUMENTS

| 2004/0046732 | A1  | 3/2004 | Chesters |
| 2005/0206619 | A1  | 9/2005 | McLoone et al. |
| 2006/0012577 | A1  | 1/2006 | Kyrola |
| 2006/0132447 | A1* | 6/2006 | Conrad ................ G06F 3/0219 345/168 |

FOREIGN PATENT DOCUMENTS

| CN | 1808345 A      | 7/2006  |
| CN | 2847375 Y      | 12/2006 |
| KR | 1019980016513  | 6/1998  |
| KR | 1020040023136 A | 3/2004 |
| KR | 1020040050576  | 6/2004  |
| KR | 1020050078948 A | 8/2005 |
| KR | 1020070114484  | 12/2007 |
| TW | 398653 U       | 7/2000  |
| TW | I253004 B      | 4/2006  |
| WO | 02/25421 A1    | 3/2002  |

OTHER PUBLICATIONS

"First Office Action dated Jul. 19, 2011," Chinese Application No. 200780101612.8, 21 pages.
"Second Office Action dated Mar. 16, 2012," Chinese Application No. 200780101612.8, 24 pages.
"Office Action dated Oct. 29, 2013," Taiwan Application No. 097136175, 11 pages.
"First Office Action dated Oct. 30, 2013," Korean Application No. 10-2010-7008520, 9 pages.
First Office Action dated Aug. 8, 2017 in corresponding Chinese Patent Application No. 201510496761.5, 27 pages.

* cited by examiner

| Software Application | |
|---|---|
| Key:<br>Launch application:<br>Load "shortcut-key" profile: | |

SYSTEM AND METHOD FOR KEY FUNCTION SWITCHING

CROSS REFERENCE TO RELATED APPLICATIONS

This application is a continuation of and claims benefit to U.S. application Ser. No. 12/293,658 having a 35 U.S.C. § 371 date of Sep. 15, 2009 which is a national stage entry of PCT/SG2007/000317 filed on Sep. 19, 2007; both of which are expressly incorporated by reference herein in their entireties.

FIELD OF INVENTION

The invention relates generally to human interface devices for personal computers. In particular, the invention relates to a system and method for switching processes selectable by keys on human interface devices.

BACKGROUND

Gaming, whether done on the ubiquitous personal computer (PC) or console platform, is fast gaining popularity worldwide. As a result, the PC and video game industries are posting record sales for portable and console hardware, software and accessories. Further, with the vast improvement of Internet technology, online gaming is also poised to take off as the next wave for PC gaming.

Typically, players use human interface devices (HIDs) such as keyboards and mice to interact with PC games. The PC games typically belong to genres ranging from First Person Shooter (FPS) games to Massive Multiplayer Online Role Player Games (MMORPGs). In order to play the PC games, the players generally use a combination of the "WASD" keys of the keyboard and the mouse as means for interacting with the PC games. Such a control scheme is commonly referred to as the "WASD/Mouse" combination. The "WASD" keys typically provide movements for game characters including forward, backward, left and right sidestepping. Additionally, the mouse is used for controlling the game characters' movement directions in which the players control the game characters for character interaction when they play the PC games.

Modifier keys such as "CTRL", "WINDOWS", "ALT" and "SHIFT" are shortcut keys used in conjunction with other keyboard keys for most PC games. The shortcut keys are typically used for expanding on additional game playing functions for the PC games. Although the shortcut keys enable the players to have more game control functions for game play, inappropriate positioning of the shortcut keys can create discomfort for players who frequently use the shortcut keys during game play. The design of most modern keyboards locates the modifier keys around non-ergonomic areas of the keyboards, which are typically on the lower right and left corners. Consider a right-handed player who controls the mouse with the right hand and controls the "WASD" keys on the keyboard with the left hand during game play. The player might encounter inconvenience when attempting to use the left hand to access the modifier keys. As a result, many players suffer from wrist strain and pain after PC game playing sessions. Such situations thus bring about decreased satisfaction in overall gaming experience for many players.

US Patent No. US2006/209014A1 (prior art) discloses a system and method in which pen gestures enable a mode to be entered in which a computing device acts as if a modifier key was being pressed. The system and method comprise using low-level software drivers linked to an Operating System's (OS) kernel for capturing and recognizing input feedbacks in the form of user gestures made via input devices such as a mouse, a pen digitizer or a touch digitizer. Based on the user gestures detected, one or more modes corresponding to pressing a keyboard modifier key or issuing one-time commands or the like can be initiated by the low-level software drivers. However, such a system and method are not suitable for PC gaming implementations since the input devices are typically used for controlling movements of game characters in PC games using user gestures. Hence, the system and method as described in the prior art can result in considerable confusion for gamers when selecting the correct gaming commands to use.

Hence, there affirms a need for a system and method for addressing at least one of the foregoing problems of using HIDs for playing PC games.

SUMMARY

Embodiments of the invention disclosed herein provide a system and method for switching processes selectable through keys on human interface devices.

In accordance with a first aspect of the invention, there is disclosed in a human interface device communicable with a computing device, a method for switching processes performable by the computing device comprising the step of detecting actuation of a switch on the human interface device. The method further comprises the step of communicating with the computing device for switching from a first process selectably performable by the computing device to a second process selectably performable by the computing device in response to the actuation of the switch. Each of the first and second processes selectably performable by the computing device is selectable by actuation of at least one process selection key.

In accordance with a second aspect of the invention, there is disclosed in a human interface device communicable with a computing device, the human interface device comprising a switch and a communication interface. The switch is actuable by a user of the human interface device. The communication interface communicates with the computing device for switching from a first process selectably performable by the computing device to a second process selectably performable by the computing device in response to the actuation of the switch. Each of the first and second processes selectably performable by the computing device is selectable by at least one process selection key actuable by the user of the human interface device.

BRIEF DESCRIPTION OF THE DRAWINGS

Embodiments of the invention are disclosed hereinafter with reference to the drawings, in which.

DETAILED DESCRIPTION

A device and a method for switching processes selectable by keys on a human interface device (HID) are described hereinafter for addressing the foregoing problems.

For purposes of brevity and clarity, the description of the invention is limited hereinafter to applications related to switching processes selectable by keys on HIDs (or key function switching). This however does not preclude various embodiments of the invention from other applications that require similar operating performance. The fundamental operational and functional principles of the embodiments of the invention are common throughout the various embodiments.

Exemplary embodiments of the invention described hereinafter are in accordance with FIGS. 1 to 7 of the drawings, in which like elements are numbered with like reference numerals.

Figure 1:
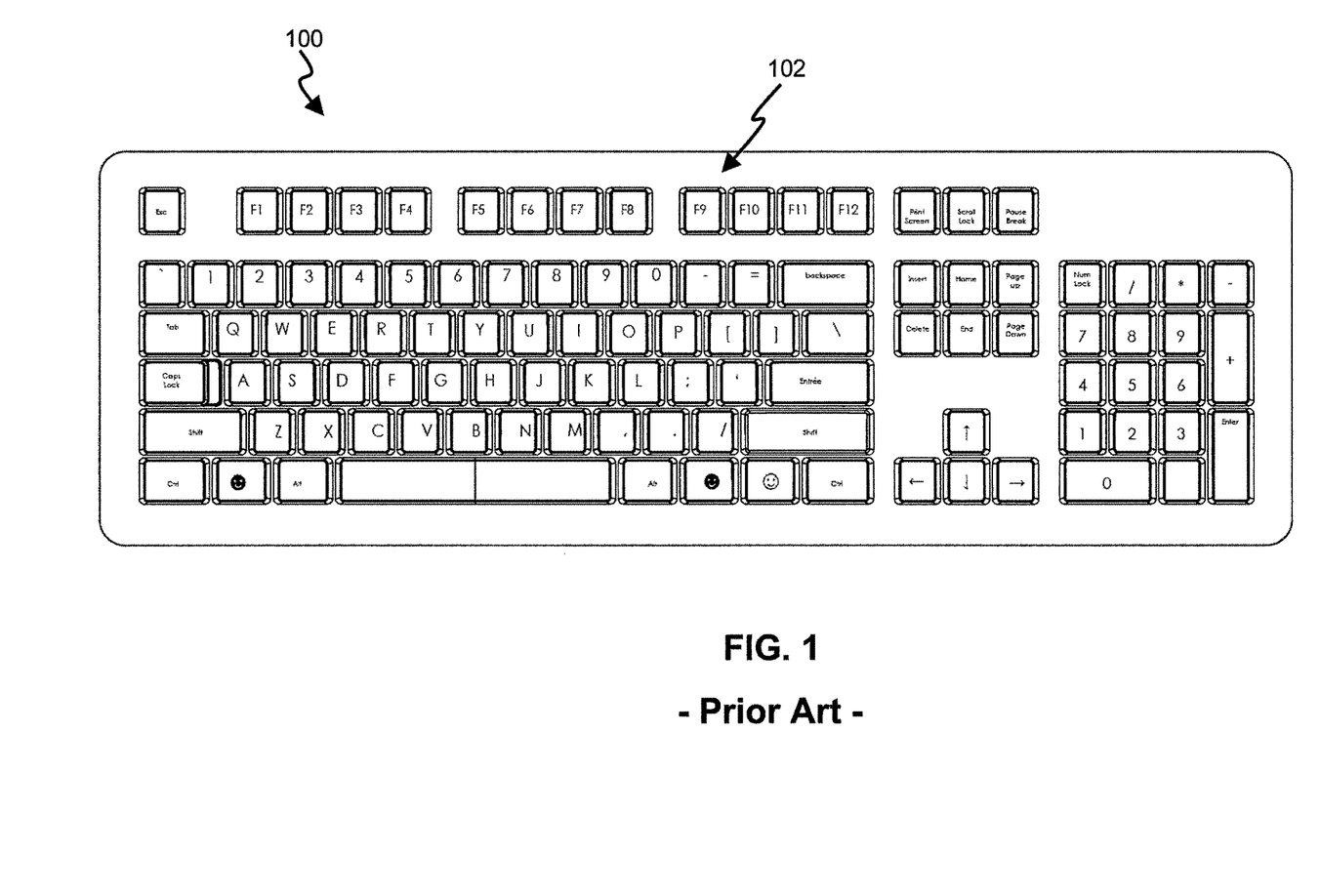
FIG. 1 shows a conventional keyboard.
Figure 2:
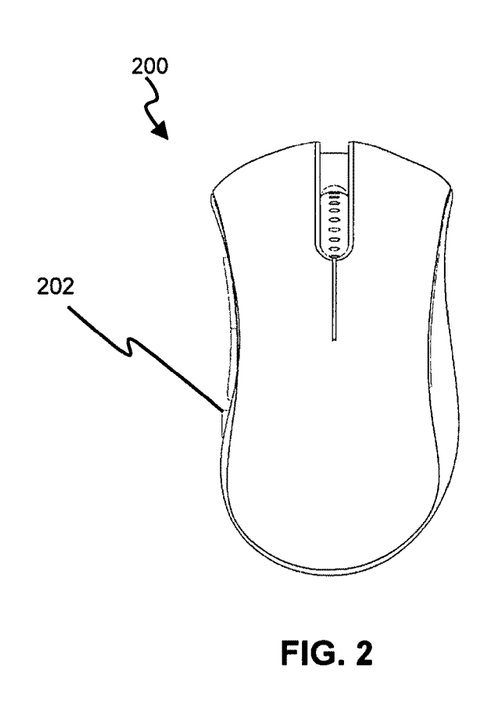
FIG. 2 shows a mouse with a switch for providing key function switching for a human interface device (HID) such as the keyboard of FIG. 1 according to an embodiment of the invention.

According to an embodiment of the invention, a system for switching processes of a software application executing in a computing device, for instance a personal computer is disclosed hereinafter. The processes are selectable through keys on human interface devices (HIDs) or input devices such as a keyboard 100 shown in FIG. 1 and a mouse 200 shown in FIG. 2 is described hereinafter. The keyboard 100 comprises any key 102. A user (not shown) then uses a switch incorporated on the mouse 200, such as a switch 202, to switch the key 102 from a first function to a second function for switching from a first process to a second process of the software application. The first and second functions are preferably already pre-defined and pre-configured to the key 102. Additionally, the first and second functions may be pre-determined by the user before being configured to the key 102.

The keyboard 100 is one of wired and wireless types. A wired keyboard 100 preferably couples and communicates to a computer system (not shown) via a communication interface being one of PS/2 and Universal-Serial-Bus (USB). On the other hand, a wireless keyboard 100 preferably couples and communicates to the computer system via a communication interface being one of Bluetooth, Infrared (IR), Radio-Frequency (RF) and Wireless USB. Further, the keyboard 100 is preferably an IBM-compatible keyboard with a QWERTY keyboard layout design.

As shown in FIG. 2, the switch 202 is preferably ergonomically located on the mouse 200 so as to be easily accessible by the user, such as along a side portion of the mouse 200. Alternatively, other usable HIDs include a trackball, touchpad, digitizing pen, gamepad, graphics tablet and joystick. Additionally, the mouse 200 is one of type wired and wireless. A wired mouse 200 preferably couples and communicates to the computer system via a communication interface being one of PS/2 and Universal-Serial-Bus (USB). A wireless mouse 200 however preferably couples and communicates to the computer system via a communication interface being one of Bluetooth, Infrared (IR), Radio-Frequency (RF) and Wireless USB. Alternatively, the mouse 200 may be coupled directly to the keyboard 100 via one of the wired and wireless means. Further, the switch 202 is preferably operable on any computer systems without having to install additional software drivers for the Operating Systems (OS) installed on the computer systems. The OS is preferably one of Microsoft Windows, LINUX, UNIX and Mac OSX.

Typically, different primary functions of the keys 102 are already pre-associated with different primary processes of a PC game. According to the embodiment of the invention, the user initially uses a software application (not shown) for pre-defining and configuring secondary functions corresponding to secondary processes of the PC game to any one of the keys 102. The user then switches to the secondary functions of the keys 102 whenever required by actuating the switch 202. Hence, the secondary functions of the keys 102 are selected instead when the user actuates the keys 102. To switch the keys 102 back to the primary functions, the user actuates the switch 202. Alternatively, the secondary functions of the keys 102 are selected when the switch 202 is actuated together with the keys 102. When the switch 202 is released, the keys 102 revert to the primary functions.

Additionally, the switch 202 is preferably and alternatively usable in conjunction with any processor-based devices (not shown) that have buttons or keys. Processor-based devices include gamepads, video gaming consoles, joysticks and the like. The switch 202 then enables functions switching (from primary functions to secondary functions) of the buttons or keys of the computer peripheral devices to be achieved by actuating the switch 202 together with the buttons or keys. Alternatively, functions switching of the buttons or keys of the processor-based devices are achievable by actuating the switch 202 once to switch to the secondary functions. Subsequently, when the primary functions are required again, the switch 202 is then actuated to switch the buttons or keys back to the primary functions.

Figure 3:
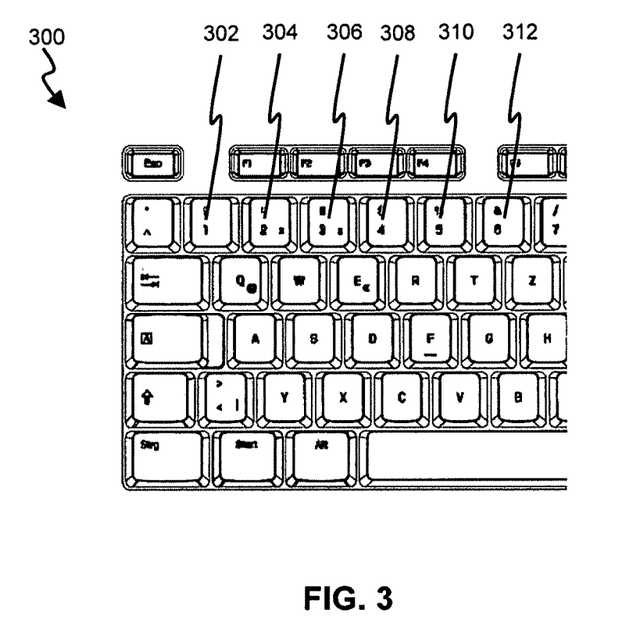
FIG. 3 shows keys of the keyboard of FIG. 1 used in conjunction with the switch of the mouse of FIG. 2 for switching between pre-configured primary and secondary functions of the keys upon actuating the switch of the mouse of FIG. 2.

An example illustrating the usage of the switch 202 with the keyboard 100 is as shown in FIG. 3. In a typical PC game, in-game processes such as Shoot, Jump, Crouch, Cast-Spell-A, Cast-Spell-B and Cast-Spell-C are configurable to any keys 102 of the keyboard 100. Hence, the user may configure the aforementioned six in-game processes to key-one 302, key-two 304, key-three 306, key-four 308, key-five 310 and key-six 312, respectively. However, during play of the PC game, key-four 308, key-five 310 and key-six 312 are not easily accessible by the user.

According to the embodiment of the invention, the user can however use the software application to configure Shoot, Jump and Crouch as primary processes and Cast-Spell-A, Cast-Spell-B and Cast-Spell-C as secondary processes to key-one 302, key-two 304 and key-three 306, respectively. Thus, when the user is playing the PC game, the user simply actuates key-one 302, key-two 304 and key-three 306 for selecting the Shoot, Jump and Crouch processes, respectively. By actuating the switch 202, the user then activates the secondary functions of key-one 302, key-two 304 and key-three 306. As a result, when the user presses key-one 302, key-two 304 and key-three 306 during play of the PC game, the Cast-Spell-A, Cast-Spell-B and Cast-Spell-C processes are now respectively selected instead of the Shoot, Jump and Crouch processes. The primary functions of key-one 302, key-two 304 and key-three 306 may be reverted by actuating the switch 202 again.

Alternatively, the Cast-Spell-A, Cast-Spell-B and Cast-Spell-C processes are selectable by actuating the switch 202 together with one of key-one 302, key-two 304 and key-three 306, respectively. Thus for example, when the switch 202 is actuated together with key-one 302, the Cast-Spell-A process is now selected instead of the Shoot process. However, when the switch 202 is released, key-one 302 then selects the Shoot process again.

Figure 4:
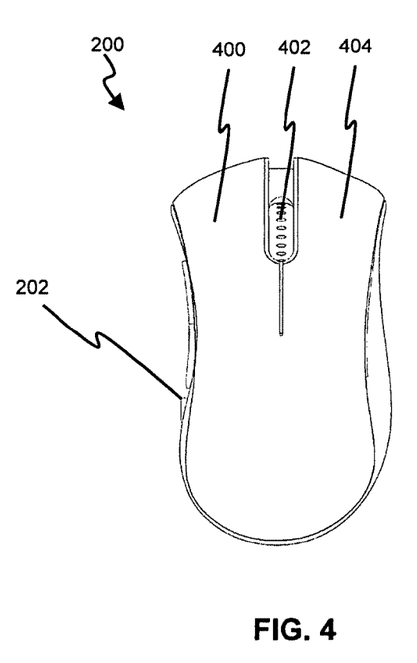
FIG. 4 shows further buttons of the mouse of FIG. 2 used in conjunction with the switch of the mouse for switching between pre-configured primary and secondary functions of the keys upon actuating the switch of the mouse of FIG. 2.

Additionally, the switch 202 also allows alternative processes to be provided to at least one button of the mouse 200. The alternative processes are preferably programmable by the user. FIG. 4 shows a left button 400, a scroll button 402 and a right button 404 of the mouse 200. For example, in a typical PC game, the user is able to configure in-game processes such as Attack, Jump, Cast-Spell-A and Cast-Spell-B to buttons of the mouse 200. However, due to the lack of buttons available on the mouse 200, only two of the aforementioned in-game processes are configurable to the buttons of the mouse 200. According to the embodiment of the invention, the user can however use the software application to configure all four of the aforementioned in-game processes to the buttons of the mouse 200, in which the four in-game processes are used in conjunction with the switch 202. The user then configures Attack and Jump as primary processes to the left button 400 and right button 404, respectively and Cast-Spell-A and Cast-Spell-B as secondary processes to the left button 400 and right button 404, respectively. By default, when the user actuates the left button 400 or right button 404 on the mouse 200, the Attack or Jump process is selected respectively. However, when the user actuates the switch 202, the secondary processes associated with the left button 400 and right button 404 respectively are selected instead. Thus, the Cast-Spell-A or Cast-Spell-B process is respectively selected when the user either actuates the left button 400 or right button 404.

Yet alternatively, the Cast-Spell-A and Cast-Spell-B processes are selectable by actuating the switch 202 together with either the left button 400 or right button 404, respectively. Thus for example, when the switch 202 is actuated together with the left button 400, the Cast-Spell-A process is now selected instead of the Attack process. However, when the switch 202 is released, the left button then selects the Attack process again.

Figure 5:
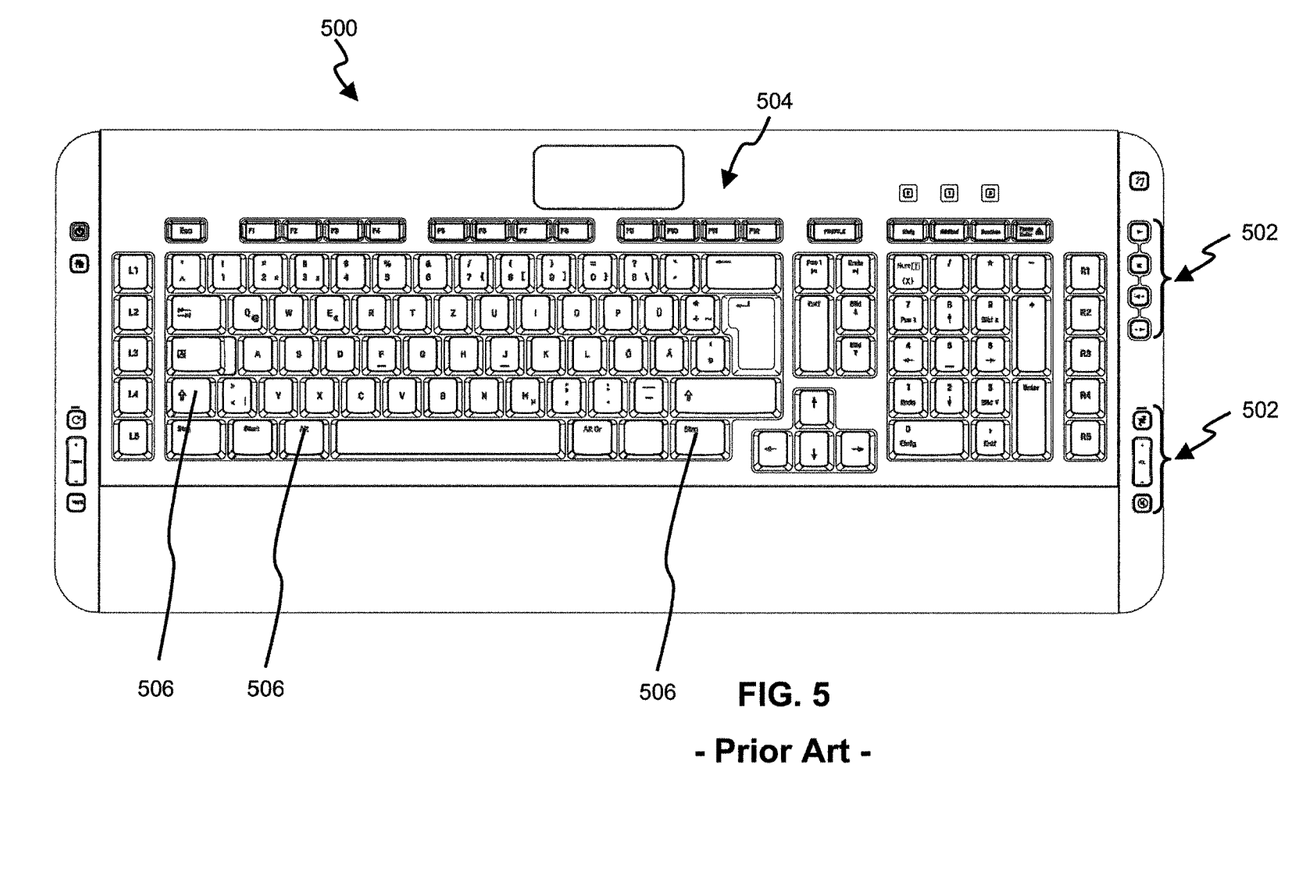
FIG. 5 shows a keyboard with multimedia buttons for selecting multimedia functions.

FIG. 5 shows another keyboard 500 of the conventional type. The keyboard 500 is an enhanced version of the keyboard 100 of FIG. 1 in which the keyboard 500 is incorporated with multimedia function buttons 502 such as volume buttons, a play button, a fast-forward button and a reverse button, in addition to the available conventional keys 504. Typically, a conventional keyboard such as the keyboard 500 is pre-built with modifier keys such as "CTRL", "ALT" and "SHIFT" keys 506. The switch 202 of the mouse 200 is programmable and configurable to take on functionality of one of the "CTRL", "ALT" and "SHIFT" keys 506. Hence, when the user actuates the switch 202 on the mouse 200, the switch 202 now emulates the functionality of one of the "CTRL", "ALT" and "SHIFT" keys 506. The switch 202 is then usable in combination with the keys 504 to form shortcut keys for accessing different pre-defined in-game processes. Configuring the shortcut keys allows the user quicker access to the in-game processes without having to position their hands in a non-ergonomic manner on the keyboard 500 during game play. In addition, due to the ergonomic positioning of the shortcut keys, the user is less likely to incur computer-related injuries resulting from prolong usage of the computer system such as Carpal Tunnel Syndrome (CTS).

Alternatively, the switch 202 is usable in combination with the keys 504 to form shortcut keys for accessing different pre-defined in-program processes of a computer animation application. Examples of the in-program processes are drawing, colouring, animating and sound effects features of the computer animation application. In this manner, the in-program processes are configured such that each of the in-program processes is activated through actuating a corresponding pre-defined key 504 on the keyboard 500 in conjunction with the switch 202.

Figure 6:
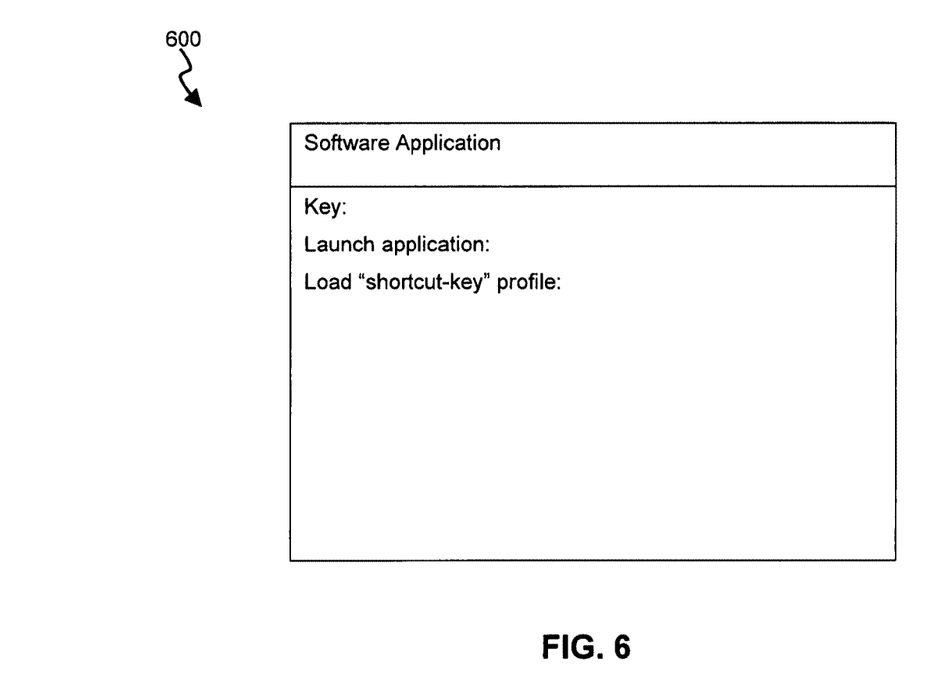
FIG. 6 shows a graphical format of a software application used in conjunction with the switch of the mouse of FIG. 2 and a HID such as the keyboard of FIG. 5 for configuring a shortcut key for providing key function switching.

Additionally, the switch 202 is also programmable using a software application 600 as shown in FIG. 6. The software application 600 enables the configuration of the switch 202 together with keys of a HID such as the keyboard 500 of FIG. 5. Hence, a unique code corresponding to the configuration of actuating at least one of the keys 504 in conjunction with the switch 202 is pre-definable by the user. The unique code is then stored in a "shortcut-key" profile on the computer system. Alternatively, the "shortcutkey" profile is stored on the mouse 200. Additionally, the unique code is also associated with a software application. Whenever the computer system detects an activation corresponding to the unique code, the software application is then activated by the computer system. The unique code is activatable by the keyboard 500 whenever the user actuates the switch 202 in conjunction with a pre-defined key selected from one of the keys 504.

Figure 7:
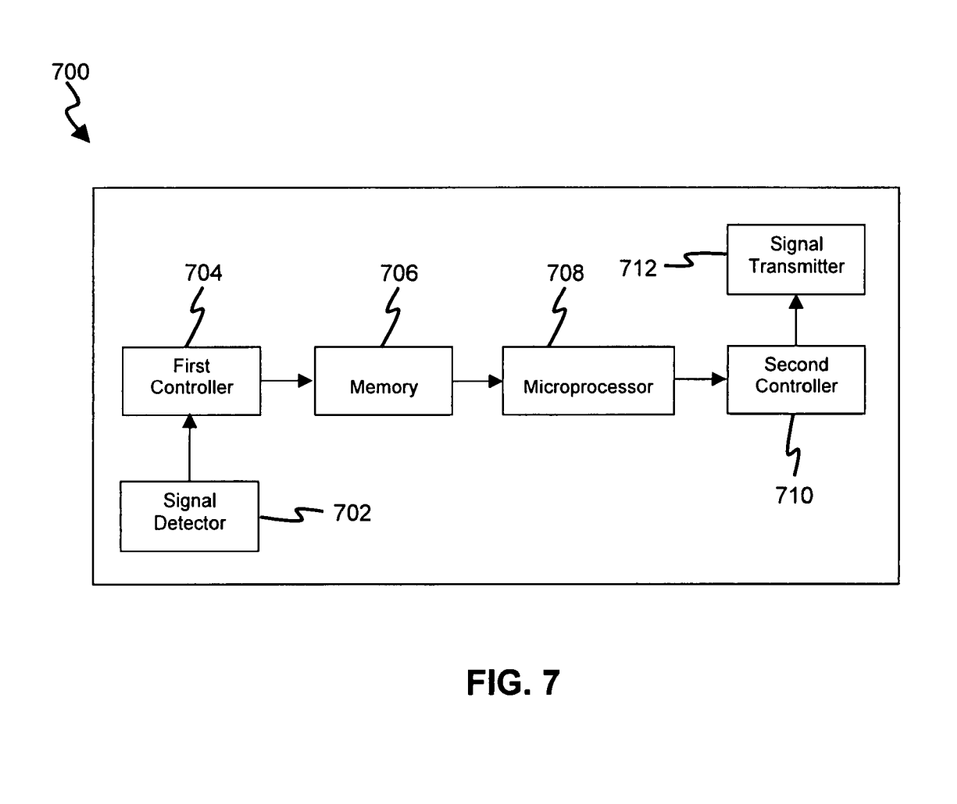
FIG. 7 shows a block diagram format of system modules for providing a hardware implementation for the mouse of FIG. 2.

The software application 600 comprises the respective options: a key, a launch-application and a load-"shortcut-key"-profile respectively. The key option specifies one of the keys 504. The launch-application option allows the user to define a software application to be activated upon detection of the unique code corresponding to the usage of the shortcut keys. Lastly, the load-"shortcut-key"-profile option allows the user to decide whether the "shortcut" profile is to be loaded into computer memory by the computer system upon system startup. According to another embodiment of the invention, a hardware implementation 700 for the mouse 200 is shown in FIG. 7. The hardware implementation 700 comprises a signal detector 702, a first controller 704, memory 706, a microprocessor 708, a second controller 710 and a signal transmitter 712. The signal detector 702 contains sensing circuitry to detect if the mouse 200 receives any input signals. The received input signals are then forwarded to the first controller 704, which processes requests of sending and storing of received input signals into the memory 706. The memory 706 serves as a storage space to temporarily store the received input signals before subjecting the received input signals to further processing by the microprocessor 708. The memory 706 is preferably one of semiconductor memory devices such as static and dynamic random access memory (RAM) and flash devices. The microprocessor 708 is responsible for processing the received input signals to derive digital information such as coordinates of current position of the mouse 200. Subsequently, the microprocessor 708 sends the digital information to the second controller 710, which processes organization of the digital information before transmitting the digital information as output signals. Lastly, the signal transmitter 712 transmits the digital information to the computer system via the communication interface to which the mouse 200 couples and communicates. In the foregoing manner, a system and a method for switching processes selectable by keys on human interface devices are described according to embodiments of the invention for addressing at least one of the foregoing disadvantages. Although a few embodiments of the invention are disclosed, it will be apparent to one skilled in the art in view of this disclosure that numerous changes and/or modification can be made without departing from the scope and spirit of the invention.

EXAMPLES

The following examples pertain to further embodiments.

Example 1 is a method for switching processes performable by the computing device in a human interface device communicable with a computing device, the method comprising the steps of: detecting actuation of a switch on the human interface device; and communicating with the computing device for switching from a first process selectably performable by the computing device to a second process selectably performable by the computing device in response to the actuation of the switch, wherein each of the first and second processes selectably performable by the computing device is configurably selectable by actuation of at least one process selection key.

In example 2, the subject matter of example 1 can optionally include that the step of detecting actuation of the switch on the human interface device comprises the step of detecting actuation of a switch on an input device.

In example 3, the subject matter of example 2 can optionally include that the step of detecting actuation of the switch on the input device comprises the step of detecting actuation of a switch on a mouse.

In example 4, the subject matter of example 1 can optionally include that each of the first and second processes selectably performable by the computing device is configurably selectable by actuation of at least one process selection key of an input device.

In example 5, the subject matter of example 4 can optionally include that each of the first and second processes selectably performable by the computing device is configurably selectable by actuation of at least one process selection key of a keyboard.

In example 6, the subject matter of example 1 can optionally include the step of detecting deactuation of the switch.

In example 7, the subject matter of example 6 can optionally the step of communicating with the computing device for switching from the second process selectably performable by the computing device to the first process selectably performable by the computing device in response to the deactuation of the switch.

In example 8, the subject matter of example 1 can optionally include that the step of communicating with the computing device for switching from a first process selectably performable by the computing device to a second process selectably performable by the computing device in response to the actuation of the switch comprises the step of communicating with the computing device for switching from a first in-game process selectably performable by the computing device to a second in-game process selectably performable by the computing device in response to the actuation of the switch.

In example 9, the subject matter of example 8 can optionally include the step of detecting deactuation of the switch.

In example 10, the subject matter of example 9 can optionally include the step of communicating with the computing device for switching from the second in-game process selectably performable by the computing device to the first in-game process selectably performable by the computing device in response to the deactuation of the switch.

In example 11, the subject matter of example 1 can optionally include that the switch is disposed on a mouse and the at least one process selection key is disposed on a keyboard.

In example 12, the subject matter of example 11 can optionally include that the first and second processes selectably performable by the computing device are switchable by actuation of one of shift (SHIFT), alternate (ALT) and control (CTRL) keys disposed on the keyboard and selectable by actuation of the at least one process selection key.

In example 13, the subject matter of example 1 can optionally include the step of communicating with the computing device for configuring at least one of the first and second processes selectably performable by the computing device for selection by actuation of the at least one process selection key, wherein an association between the at least one of the first and second processes and the at least one process selection key is definable in a configuration profile storable on at least one of the human interface device and the computing device.

Example 14 is a human interface device communicable with a computing device, the human interface device comprising: a switch actuable by a user of the human interface device; and a communication interface for communicating with the computing device for switching from a first process selectably performable by the computing device to a second process selectably performable by the computing device in response to the actuation of the switch, wherein each of the first and second processes selectably performable by the computing device is configurably selectable by at least one process selection key actuable by the user of the human interface device.

In example 15, the subject matter of example 14 can optionally include that the human interface device is an input device.

In example 16, the subject matter of example 15 can optionally include that the input device is a mouse.

In example 17, the subject matter of example 14 can optionally include that each of the first and second processes selectably performable by the computing device is configurably selectable by at least one process selection key of an input device actuable by the user of the human interface device.

In example 18, the subject matter of example 17 can optionally include that each of the first and second processes selectably performable by the computing device is configurably selectable by at least one process selection key of a keyboard actuable by the user of the human interface device.

In example 19, the subject matter of example 14 can optionally include that the switch is deactuable by the user of the human interface device.

In example 20, the subject matter of example 19 can optionally include that the communication interface is for communicating with the computer device for switching from the second process selectably performable by the computing device to the first process selectably performable by the computing device in response to the deactuation of the switch.

In example 21, the subject matter of example 14 can optionally include that the communication interface for communicating with the computing device for switching from a first process selectably performable by the computing device to a second process selectably performable by the computing device in response to the actuation of the switch is for communicating with the computing device for switching from a first in-game process function selectably performable by the computing device to a second in-game process selectably performable by the computing device in response to the actuation of the switch.

In example 22, the subject matter of example 21 can optionally include that the switch is deactuable by the user of the human interface device.

In example 23, the subject matter of example 22 can optionally include that the communication interface is for communicating with the computing device for switching from the second in-game process selectably performable by the computing device to the first in-game process selectably performable by the computing device in response to the deactuation of the switch.

In example 24, the subject matter of example 14 can optionally include that the switch is disposed on a mouse and the at least one process selection key is disposed on a keyboard.

In example 25, the subject matter of example 24 can optionally include that the first and second processes selectably performable by the computing device are switchable by actuation of one of shift (SHIFT), alternate (ALT) and control (CTRL) keys disposed on the keyboard and selectable by actuation of the at least one process selection key.

In example 26, the subject matter of example 14 can optionally include that the communication interface communicates with the computing device providing a software interface for configuring at least one of the first and second processes selectably performable by the computing device for selection by actuation of the at least one process selection key, wherein an association between the at least one of the first and second processes and the at least one process selection key is definable in a configuration profile storable on at least one of the human interface device and the computing device.

Example 27 is a method for switching processes performable by the computing device, in a computing system comprising a computing device communicatively couplable to a human interface device, the method comprising the steps of: detecting actuation of a switch on the human interface device; and providing communication between the human interface device and the computing device for switching from a first process selectably performable by the computing device to a second process selectably performable by the computing device in response to the actuation of the switch, wherein each of the first and second processes selectably performable by the computing device is configurably selectable by actuation of at least one process selection key.

In example 28, the subject matter of example 27 can optionally include that the step of detecting actuation of the switch on the human interface device comprises the step of detecting actuation of a switch on an input device.

In example 29, the subject matter of example 28 can optionally include that the step of detecting actuation of the switch on the input device comprises the step of detecting actuation of a switch on a mouse.

In example 30, the subject matter of example 27 can optionally include that each of the first and second processes selectably performable by the computing device is configurably selectable by actuation of at least one process selection key of an input device.

In example 31, the subject matter of example 30 can optionally include that each of the first and second processes selectably performable by the computing device is configurably selectable by actuation of at least one process selection key of a keyboard.

In example 32, the subject matter of example 27 can optionally include that the method for switching processes performable by the computing device further comprises the step of detecting deactuation of the switch.

In example 33, the subject matter of example 32 can optionally include that the method for switching processes performable by the computing device further comprises the step of communicating with the computing device for switching from the second process selectably performable by the computing device to the first process selectably performable by the computing device in response to the deactuation of the switch.

In example 34, the subject matter of example 27 can optionally include that the method for switching processes performable by the computing device having the step of communicating with the computing device for switching from a first process selectably performable by the computing device to a second process selectably performable by the computing device in response to the actuation of the switch comprises the step of communicating with the computing device for switching from a first in-game process selectably performable by the computing device to a second in-game process selectably performable by the computing device in response to the actuation of the switch.

In example 35, the subject matter of example 34 can optionally include that the method for switching processes performable by the computing device further comprises the step of detecting deactuation of the switch.

In example 36, the subject matter of example 35 can optionally include that the method for switching processes performable by the computing device further comprises the step of communicating with the computing device for switching from the second in-game process selectably performable by the computing device to the first in-game process selectably performable by the computing device in response to the deactuation of the switch.

In example 37, the subject matter of example 27 can optionally include that the switch is disposed on a mouse and the at least one process selection key is disposed on a keyboard.

In example 38, the subject matter of example 37 can optionally include that the first and second processes selectably performable by the computing device are switchable by actuation of one of shift (SHIFT), alternate (ALT) and control (CTRL) keys disposed on the keyboard and selectable by actuation of the at least one process selection key.

In example 39, the subject matter of example 27 can optionally include that the method for switching processes performable by the computing device further comprises the step of communicating with the computing device for configuring at least one of the first and second processes selectably performable by the computing device for selection by actuation of the at least one process selection key, wherein an association between the at least one of the first and second processes and the at least one process selection key is definable in a configuration profile storable on at least one of the human interface device and the computing device.

Example 40 is a machine readable medium having stored therein a plurality of programming instructions, which when executed, the instructions cause a computing device to perform the step of: detecting actuation of a switch on a human interface device communicable with the computing device; and providing communication between the human interface device and the computing device for switching from a first process selectably performable by the computing device to a second process selectably performable by the computing device in response to the actuation of the switch, wherein each of the first and second processes selectably performable by the computing device is configurably selectable by actuation of at least one process selection key.

In example 41, the subject matter of example 40 can optionally include that the instructions cause the computing device to perform the step of detecting actuation of the switch on the human interface device comprises the step of detecting actuation of a switch on an input device.

In example 42, the subject matter of example 41 can optionally include that the instructions cause the computing device to perform the step of detecting actuation of the switch on the input device comprises the step of detecting actuation of a switch on a mouse.

In example 43, the subject matter of example 40 can optionally include that each of the first and second processes selectably performable by the computing device is configurably selectable by actuation of at least one process selection key of an input device.

In example 44, the subject matter of example 43 can optionally include that each of the first and second processes selectably performable by the computing device is configurably selectable by actuation of at least one process selection key of a keyboard.

In example 45, the subject matter of example 40 can optionally include that the instructions cause the computing device to further perform the step of detecting deactuation of the switch.

In example 46, the subject matter of example 45 can optionally include that the instructions cause the computing device to further perform the step of communicating with the computing device for switching from the second process selectably performable by the computing device to the first process selectably performable by the computing device in response to the deactuation of the switch.

In example 47, the subject matter of example 40 can optionally include that the instructions cause the computing device to perform the step of communicating with the computing device for switching from a first process selectably performable by the computing device to a second process selectably performable by the computing device in response to the actuation of the switch comprises the step of communicating with the computing device for switching from a first in-game process selectably performable by the computing device to a second in-game process selectably performable by the computing device in response to the actuation of the switch.

In example 48, the subject matter of example 47 can optionally include that the instructions cause the computing device to further perform the step of detecting deactuation of the switch.

In example 49, the subject matter of example 48 can optionally include that the instructions cause the computing device to further perform the step of communicating with the computing device for switching from the second in-game process selectably performable by the computing device to the first in-game process selectably performable by the computing device in response to the deactuation of the switch.

In example 50, the subject matter of example 40 can optionally include that the switch is disposed on a mouse and the at least one process selection key is disposed on a keyboard.

In example 51, the subject matter of example 50 can optionally include that the first and second processes selectably performable by the computing device are switchable by actuation of one of shift (SHIFT), alternate (ALT) and control (CTRL) keys disposed on the keyboard and selectable by actuation of the at least one process selection key.

In example 52, the subject matter of example 40 can optionally include that the instructions cause the computing device to further perform the step of communicating with the computing device for configuring at least one of the first and second processes selectably performable by the computing device for selection by actuation of the at least one process selection key, wherein an association between the at least one of the first and second processes and the at least one process selection key is definable in a configuration profile storable on at least one of the human interface device and the computing device.

The invention claimed is:

1. A first input device comprising:
a communication interface configured to couple the first input device to a computing device, the computing device running an application, wherein the computing device is in communication with a second input device, the second input device comprising a key configured to trigger a first process in the application upon actuation of the key;
a button configured to trigger execution of a second process in the application upon actuation of the button; and
a switch configured to activate a re-configuration of each of the key and the button such that after the re-configuration, the key is configured to trigger a third process in the application upon actuation of the key and the button is configured to trigger a fourth process in the application upon actuation of the button;
wherein the second input device is different from the first input device;
wherein the switch of the first input device is different from the button of the first input device.

2. The first input device of claim 1, further comprising:
a memory storing a shortcut-key profile.

3. The first input device of claim 2, wherein the switch is configured to activate the re-configuration of each of the key and the button, based at least in part on the shortcut-key profile.

4. The first input device of claim 2, wherein the first input device is configured to load the shortcut-key profile into the computing device.

5. The first input device of claim 2, wherein the first input device is configured to load the shortcut-key profile into the computing device upon startup of the computer system.

6. The first input device of claim 2, wherein the shortcut-key profile is user-configurable through a software application.

7. The first input device of claim 2, wherein the shortcut-key profile stores a plurality of shortcut combinations for triggering a respective plurality of processes in the application, wherein each shortcut combination comprises actuating the switch and any one of the button or the key.

8. The first input device of claim 2, wherein the shortcut-key profile comprises a user-definable unique code corresponding to a configuration of actuating any one of the key or the button, in conjunction with the switch.

9. The first input device of claim 1, wherein the first input device is configured to communicate with the computing device.

10. The first input device of claim 1, further comprising:
a signal detector configured to detect an actuation of the switch.

11. The first input device of claim 10, wherein the signal detector is further configured to detect a deactuation of the switch.

12. The first input device of claim 1, wherein the switch is configured to activate the re-configuration of each of the key and the button, based on detection of a first actuation of the switch.

13. The first input device of claim 1, wherein the switch is further configured to activate a further re-configuration of the key based on detection of one of a deactuation of the switch or a second actuation of the switch, wherein after the further re-configuration, the key is configured to trigger the first process in the application upon actuation of the key.

14. The first input device of claim 1, wherein the switch is further configured to activate a further re-configuration of the button based on detection of one of a deactuation of the switch or a second actuation of the switch, wherein after the further re-configuration, the button is configured to trigger the second process in the application upon actuation of the key.

15. The first input device of claim 1, wherein the first input device is one of a mouse device or a keyboard.

16. The first input device of claim 1, wherein the second input device is one of a mouse device or a keyboard.

17. The first input device of claim 1, wherein at least one of the first process, the second process, the third process and the fourth process comprises an in-game process.

18. The first input device of claim 1, wherein the switch is configurable to function as one of shift, alternate or control keys.

19. The first input device of claim 1, further comprising a software application for configuring each of the first process, second process, third process and fourth process.

* * * * *